(12) United States Patent
Gomibuchi et al.

(10) Patent No.: US 11,965,084 B2
(45) Date of Patent: Apr. 23, 2024

(54) METHOD FOR PRODUCING POLYPROPYLENE-BASED RESIN FOAMED MOLDED ARTICLE

(71) Applicant: JSP CORPORATION, Tokyo (JP)

(72) Inventors: Masahiro Gomibuchi, Shimotsuke (JP); Jinichiro Noro, Utsunomiya (JP)

(73) Assignee: JSP CORPORATION, Tokyo (JP)

(*) Notice: Subject to any disclaimer, the term of this patent is extended or adjusted under 35 U.S.C. 154(b) by 699 days.

(21) Appl. No.: 17/274,530

(22) PCT Filed: Sep. 21, 2018

(86) PCT No.: PCT/JP2018/035024
§ 371 (c)(1),
(2) Date: Mar. 9, 2021

(87) PCT Pub. No.: WO2020/059112
PCT Pub. Date: Mar. 26, 2020

(65) Prior Publication Data
US 2021/0309843 A1  Oct. 7, 2021

(51) Int. Cl.
*C08L 23/14* (2006.01)
*C08J 9/12* (2006.01)
(52) U.S. Cl.
CPC ............ *C08L 23/14* (2013.01); *C08J 9/122* (2013.01); *C08J 2323/14* (2013.01);
(Continued)
(58) Field of Classification Search
CPC .. C08L 23/14; C08L 2205/03; C08L 2207/04; C08L 2207/20; C08J 9/122;
(Continued)

(56) References Cited

U.S. PATENT DOCUMENTS 5,416,169 A  5/1995  Saito et al.
6,432,525 B1  8/2002  Gokuraku et al.
(Continued)

FOREIGN PATENT DOCUMENTS

CN  101875734 A  11/2010
EP  3235624 A1  10/2017
(Continued)

OTHER PUBLICATIONS

Supplementary EP Search Report in corresponding EP Application No. 18934358, dated Mar. 15, 2022.
(Continued)

*Primary Examiner* — K. Boyle
(74) *Attorney, Agent, or Firm* — BACON & THOMAS, PLLC

(57) ABSTRACT

A method for producing a polypropylene-based resin foamed molded article by blow molding a foamed parison formed of a base resin, in which: the base resin contains, in specific mixing proportions, a branched polypropylene-based resin (A), a linear polypropylene-based resin (B) and a recovered raw material (C) that is recovered in the course of production of the polypropylene-based resin foamed molded article. Each of the resin (A), resin (B) and the recovered raw material (C), has a specific range of a melt tension and a melt flow rate. A difference in melting point between the resin (A) and resin (B) is within a specific range. A difference in crystallization temperature between the resin (A) and resin (B) is within a specific range.

5 Claims, 1 Drawing Sheet

(52) U.S. Cl.
CPC ....... *C08J 2423/14* (2013.01); *C08L 2205/03* (2013.01); *C08L 2207/04* (2013.01); *C08L 2207/20* (2013.01)

(58) Field of Classification Search
CPC .......................... C08J 2323/14; C08J 2423/14; C08J 2400/26; C08J 2423/16; C08J 9/0061; C08J 2201/03; C08J 2203/06; C08J 2323/12; C08J 2400/22; C08J 2400/30; C08J 2423/12; Y02P 70/10; B29K 2105/04; B29K 2023/12; B29C 44/3442; B29C 44/507; B29C 49/04; B29C 44/02; B29C 2049/4667
See application file for complete search history.

(56) References Cited

U.S. PATENT DOCUMENTS

| | | | | |
|---|---|---|---|---|
| 7,014,801 | B2 * | 3/2006 | Imanari | C08J 3/226 264/45.9 |
| 2004/0062885 | A1 | 4/2004 | Imanari et al. | |
| 2006/0051543 | A1 | 3/2006 | Imanari et al. | |
| 2007/0031622 | A1 * | 2/2007 | Imanari | B29C 44/08 428/36.5 |
| 2010/0279087 | A1 | 11/2010 | Tokiwa et al. | |
| 2013/0032963 | A1 | 2/2013 | Tokiwa et al. | |
| 2018/0298174 | A1 | 10/2018 | Reichelt et al. | |

FOREIGN PATENT DOCUMENTS

| | | |
|---|---|---|
| EP | 3238910 A1 | 11/2017 |
| JP | H06299013 A | 10/1994 |
| JP | H07138422 A | 5/1995 |
| JP | 2004122488 A | 4/2004 |
| JP | 2005271499 A | 10/2005 |
| JP | 2006181957 A | 7/2006 |
| JP | 2006212952 A | 8/2006 |
| JP | 2007062364 A | 3/2007 |
| JP | 2004160670 A | 6/2010 |
| JP | 2013209551 A | 10/2013 |
| WO | 9928111 | 6/1999 |
| WO | 2011118281 A1 | 9/2011 |
| WO | 2017068106 A1 | 4/2017 |

OTHER PUBLICATIONS

International Search Report in corresponding PCT/JP2018/035024, dated Dec. 25, 2018.
Chinese Search Report in corresponding Chinese Application No. 201880097840.0, dated Jun. 18, 2022.
EP Office Action in corresponding EP Application No. 18934358.5, dated Apr. 6, 2023.
Yousef Jahani et al., Rheological and Mechanical Study of Polypropylene Ternary Blends for Foam Application, Iranian Polymer Journal, XP-002605258, 14(4), 2005, pp. 361-370.

* cited by examiner

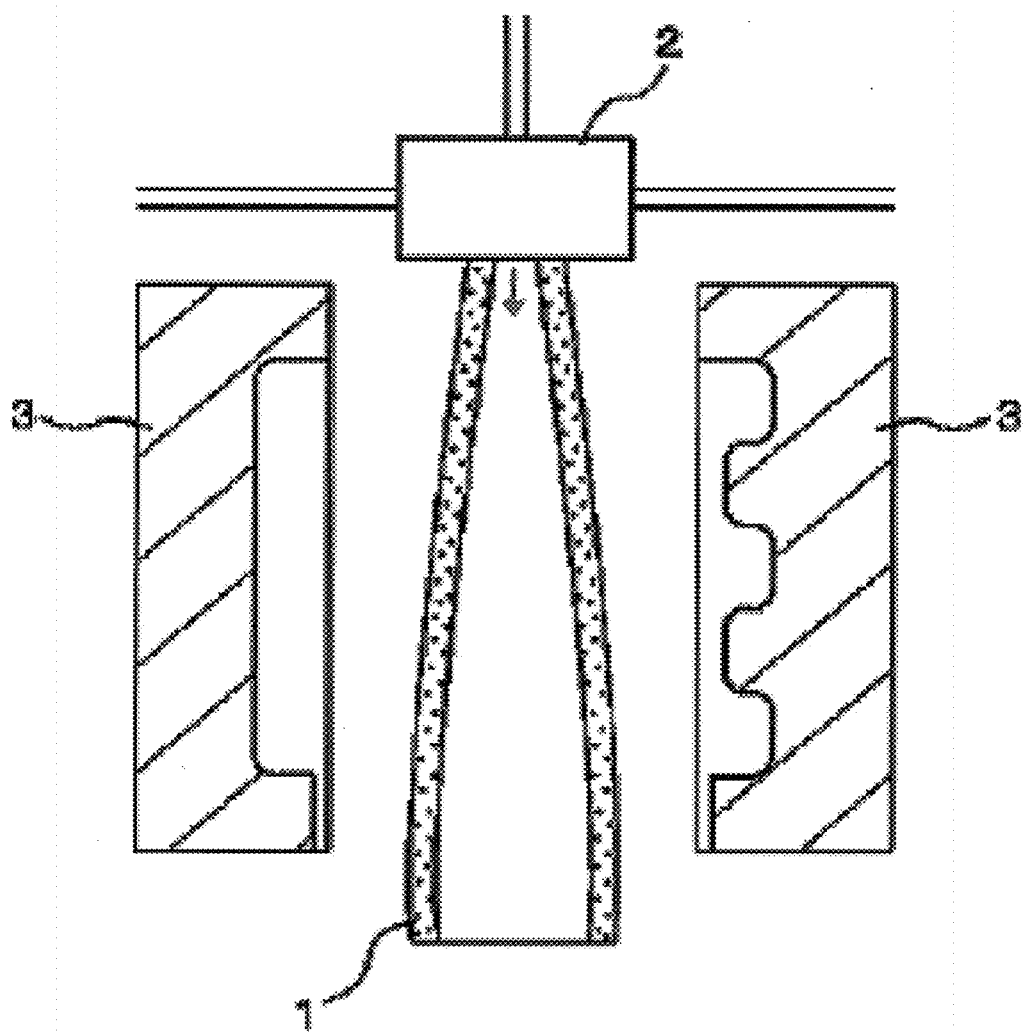

METHOD FOR PRODUCING POLYPROPYLENE-BASED RESIN FOAMED MOLDED ARTICLE

The present invention relates to a method for producing a polypropylene-based resin foamed molded article by a foam blow molding technique.

BACKGROUND OF THE INVENTION

Hollow foamed molded articles have been hitherto suitably used for air conditioning ducts, etc. of automobiles. A foamed blow-molded article is produced by, for example, melting and kneading a base resin and a blowing agent in an extruder, and extruding the kneaded mass from a die to form a foamed parison. The parison is then placed in a split mold, and a pressurized gas is blown into the foamed parison to perform blow molding (hereinafter, this molding method will be occasionally simply referred to as "foam blow molding").

As a base resin for an air-conditioning duct or the like that is constituted of a foamed blow molded article, a polypropylene-based resin is often used because of excellent balance between its heat resistance and rigidity. Further, among polypropylene-based resins, it has been proposed to use a polypropylene-based resin having a high melt tension (occasionally referred to as HMS-PP hereinafter) (Patent Document 1). The HMS-PP has a branched structure in its molecular chain and has excellent extrusion foaming properties. By using the HMS-PP, it becomes possible to obtain a good foamed molded article having a low apparent density.

However, since the HMS-PP is expensive, it has been desired to reduce the production cost of the foamed molded article. In order to solve this problem, a proposal has been made to use, as a base rein, a mixed resin obtained by mixing the branched polypropylene-based resin with a general-purpose linear polypropylene-based resin and further with a recovered raw material obtained by recovering the foamed molded article (Patent Document 2). This method has made it possible to reduce the production cost of the foamed molded article.

PRIOR ART DOCUMENT

Patent Document

[Patent Document 1] International Publication WO99/28111
[Patent Document 2] Japanese Kokai Publication JP2004-122488

In recent years, however, air-conditioning ducts for automobiles having more complicated shapes have been required. In blow molding, a parison is clamped between split molds. At this time, in a portion in which the parison is pinched between the peripheral edges of the mold cavity, the opposing inner surfaces of the parison are fusion-bonded together to form a pinch-off portion. An outer part of the pinch-off portion forms a surplus portion called a burr. The burr is finally removed to obtain a molded body.

When the shape of the foamed molded article becomes complicated, the amount of burrs increases. Therefore, from the standpoint of cost reduction, it is desired to recover substantially the entire amount of the burrs and reuse them as raw materials for the foamed molded article.

Further, when the branched polypropylene-based resin, whose branches are easily broken, is kneaded with an extruder, the branched chains are broken, resulting in a reduction of the melt tension of the resin and deterioration of the extrusion foaming properties thereof. In actual production of a foamed molded article, since the recovered raw material such as burrs contains a branched polypropylene-based resin which has been repeatedly subjected to kneading with an extruder, the extrusion foaming characteristics are liable to be significantly reduced.

When a large amount of such a recovered raw material having poor extrusion foaming properties is used to produce a foamed molded article having a low apparent density, extrusion foamability and blow moldability (both properties are hereinafter occasionally referred to as foam blow moldability) are deteriorated. Thus, it has been often difficult to produce a good foamed molded article in a stable manner since excessively large bubbles are generated in the foamed molded article, inner surfaces of the molded article are roughened, and formation of holes is caused.

SUMMARY OF THE INVENTION

It is an objective problem of the present invention to provide a method capable of stably producing a good polypropylene-based resin foamed molded article that has a low apparent density even when a large amount of a recovered raw material is used.

In accordance with the present invention, there is provided a method for producing a polypropylene resin-based foamed molded article as follows:

[1] A method for producing a polypropylene-based resin foamed molded article, comprising extruding a foamable molten resin, obtained by kneading a base resin and a physical blowing agent, through a die to form a foamed parison, and blow molding the foamed parison, said base resin comprising a branched polypropylene-based resin (A), a linear polypropylene-based resin (B) and a recovered raw material (C) that is recovered in the course of production of the polypropylene-based resin foamed molded article, wherein the branched polypropylene-based resin (A) has a melt tension (230° C.) of greater than 100 mN and a melt flow rate (230° C., load of 2.16 kg) of 0.1 to 15 g/10 min, the linear polypropylene-based resin (B) has a melt tension (230° C.) of less than 30 mN (not inclusive of 0) and a melt flow rate (230° C., load of 2.16 kg) of 5 to 25 g/10 min, the recovered raw material (C) has a melt tension (230° C.) of 5 to 50 mN and a melt flow rate (230° C., load of 2.16 kg) of 2 to 50 g/10 min, and wherein a difference ($T_mA-T_mB$) between a melting point $T_mA$ of the branched polypropylene-based resin (A) and a melting point $T_mB$ of the linear polypropylene-based resin (B) is −5° C. to 5° C., a difference ($T_cA-T_cB$) between a crystallization temperature $T_cA$ of the branched polypropylene-based resin (A) and a crystallization temperature $T_cB$ of the linear polypropylene-based resin (B) is 0 to 10° C., a mixing amount of the branched polypropylene-based resin (A) in the base resin is 5% by weight or more and less than 20% by weight based on 100% by weight of the base resin and a mixing amount of the recovered raw material (C) in the base resin is more than 65% by weight and 90% by weight or less based on 100% by weight of the base resin, and a weight ratio (A:B) of the mixing amount of the branched polypropylene-based resin (A) to a mixing amount of the linear polypropylene-based resin (B) in the base resin is 80:20 to 40:60.

[2] The method for producing a polypropylene-based resin foamed molded article according to above [1], wherein the melt flow rate (230° C., load of 2.16 kg) of the linear polypropylene-based resin (B) is 10 to 25 g/10 min.

[3] The method for producing a polypropylene-based resin foamed molded article according to above [1] or [2], wherein the melt tension (230° C.) of the recovered raw material (C) is 5 mN or more and less than 30 mN.

[4] The method for producing a polypropylene-based resin foamed molded article according to any one of above [1] to [3], wherein the physical blowing agent is an inorganic physical blowing agent.

[5] The method for producing a polypropylene-based resin foamed molded article according to any one of above [1] to [4], wherein the foamed molded article has an apparent density of 0.10 to 0.35 g/cm$^3$.

According to the production method of the present invention, by mixing, as a base resin, a specific branched polypropylene-based resin with a specific linear polypropylene-based resin and with a specific recovered raw material in specific proportions, it is possible to stably produce a good polypropylene-based resin foamed molded article having a low apparent density, even when a large amount of the recovered raw material is added.

BRIEF DESCRIPTION OF THE DRAWING

FIG. 1 is explanatory view showing an example of an apparatus used to carry out the production method of the present invention.

DETAILED DESCRIPTION OF THE INVENTION

Hereinafter, the method for producing a polypropylene resin foamed molded article of the present invention will be described in detail. In the present invention, a foamable molten resin obtained by kneading a raw material such as a polypropylene-based resin and the like resins and a physical blowing agent is extruded from a die to form a foamed parison. The foamed parison is then blow-molded to obtain a polypropylene-based resin foamed molded article (hereinafter, occasionally simply referred to as a foamed molded article).

An example of the method for producing a foamed molded article of the present invention will be described below with reference to the drawing. As shown in FIG. 1, a base resin and a physical blowing agent are kneaded in an extruder (not shown) to obtain a foamable molten resin. The molten resin is extruded through a die 2 and introduced between split molds 3, 3 which have a desired shape and which are located immediately below the die to form a foamed parison 1 (extrusion foaming step). Next, the lower part of the foamed parison 1 in the softened state is closed by a pinch (not shown), and a gas is blown into the foamed parison to increase the inside pressure and to inflate the foamed parison (pre-blow step). Thereafter, by closing the molds 3, 3, the foamed parison 1 is clamped by the molds (clamping step). A gas is then blown into the hollow portion of the foamed parison 1 clamped by the molds 3, to press the outer surface of the foamed parison 1 against the inner surface of the molds and to form a hollow shape (blow molding step). After cooling, the foamed molded product with burrs is taken out of the molds and the burrs are removed to obtain a hollow foamed molded article. Wastes such as burrs and defective foam molded products are recovered (raw material recovery step) and reused as a recovered raw material (C) which will be described hereinafter.

Incidentally, the foamed parison shown in FIG. 1 is composed only of a foam body. The foam body, however, may be laminated with a non-foamed resin layer and extruded together in the form of a multilayer parison, from which a multilayer molded article body is obtainable. Although FIG. 1 illustrates a tubular foamed parison, a sheet-like foamed parison may be used. In the method of the present invention, it is preferable to dispose an accumulator between the extruder and the die 3 or within the die.

The base resin used for forming the foamed parison is obtained by mixing the branched polypropylene-based resin (A), the linear polypropylene-based resin (B) and the recovered raw material (C) in a specific proportion (base resin formulating step). In the present invention, however, other additional component or components may be added to the base resin.

Next, the branched polypropylene-based resin (A), the linear polypropylene-based resin (B), and the recovered raw material (C) will be described. In the following description, the branched polypropylene-based resin (A) will be occasionally referred to as resin (A), and the linear polypropylene-based resin (B) will be occasionally referred to as resin (B).

In the present invention, a polypropylene-based resin is used. Examples of the polypropylene-based resin include a propylene homopolymer and a propylene-based copolymer having a structural unit derived from propylene of 50% by weight or more. Examples of the copolymer include a copolymer of propylene and ethylene or an α-olefin having 4 or more carbon atoms, such as a propylene-ethylene copolymer, a propylene-butene copolymer and a propylene-ethylene-butene copolymer; propylene-acrylic acid copolymer; and propylene-maleic anhydride copolymer and the like. These copolymers may be any of a block copolymer, a random copolymer and a graft copolymer. Further, the polypropylene-based resin may include an impact resistant polypropylene in which a rubber component such as an ethylene-propylene-diene copolymer is dispersed in a propylene homopolymer or a propylene copolymer such as a propylene-ethylene random copolymer. The polypropylene-based resin generally has a melting point in the range of about 130 to 170° C.

The resin (A) constituting the base resin in the present invention is a resin having a free terminal long chain branch in the molecular structure thereof in the above-described polypropylene-based resin. Specific examples of the resin (A) include branched homopolypropylene (trade names: WB130, WB1135, WB140) manufactured by Borealis AG, and a branched homopolypropylene resin (trade name: PF814) manufactured by Sun Allomer Co., Ltd.

The branched polypropylene-based resin (A) has a melt tension at 230° C. of greater than 100 mN. When the melt tension is too low, excessively large cells and the like may be generated, so that there is a possibility that a good foamed molded article may not be obtained. From this point of view, the melt tension of the resin (A) is preferably 150 mN or more, more preferably 200 mN or more. On the other hand, the upper limit is preferably 500 mN, more preferably 450 mN. In the present invention, the melt tension at 230° C. is referred to as melt tension (230° C.), and in the following description, the melt tension is occasionally referred to as MT.

The resin (A) has a melt flow rate, measured at 230° C. and a load of 2.16 kg, of 0.1 to 15 g/10 minutes. When the melt flow rate is too small, the fluidity of the resin containing the resin (A) at the time of melting may be deteriorated, so that the extrusion moldability may be reduced. When the melt flow rate is too large, on the other hand, it becomes difficult to suppress the drawdown of the foamed parison so that significant thickness unevenness of the obtained foamed molded article is brought about. Thus, there is a possibility that a good foamed molded article having excellent thickness accuracy may not be obtained. From this point of view, the lower limit of the melt flow rate of the resin (A) is preferably 0.5 g/10 minutes, more preferably 1 g/10 minutes. The upper limit is preferably 10 g/10 minutes, more preferably 5 g/10 minutes. In the present invention, the melt flow rate measured under the conditions of 230° C. and a load of 2.16 kg is also referred to as a melt flow rate (230° C., load of 2.16 kg). In the following description, the melt flow rate is occasionally referred to as MFR.

The resin (A) is preferably homopolypropylene, an impact-resistant polypropylene or a mixture thereof. Among them, homopolypropylene is more preferred. The resin (A) preferably has a melting point of 155 to 165° C., more preferably 157 to 162° C.

When the resin (A) is a homopolypropylene or an impact-resistant polypropylene, the crystallization temperature thereof tends to have a higher crystallization temperature as compared to the same type of linear polypropylene-based resin having the same melting point, because the resin (A) has a branched structure. The crystallization temperature of the resin (A) is about 15 to 25° C. lower than the melting point of the resin (A).

The resin (B) used in the present invention is a resin having a linear molecular chain in the above-mentioned polypropylene-based resins.

The resin (B) has a melt tension (230° C.) of less than 30 mN (not inclusive of 0). When the linear polypropylene-based resin has a high melt tension, the melt flow rate thereof also decreases. Therefore, when the melt tension is 30 mN or more, the base resin, which is melted at the time of extrusion, tends to generate heat so that excessively large cells, etc. are likely to be generated. As a consequence, there is a possibility that a good foamed molded article may not be obtained. From this point of view, the melt tension of the resin (B) is preferably 15 mN or less (not inclusive of 0), more preferably 10 mN or less (not inclusive of 0).

The resin (B) has a melt flow rate (230° C., load of 2.16 kg) of 5 to 25 g/10 minutes. When the melt flow rate is too small, the fluidity of the base resin containing the resin (B) deteriorates at the time of melting, so that heat is easily generated by shearing in the die and there is a possibility that the extrusion moldability is deteriorated. When the melt flow rate is too large, on the other hand, the foamed parison tends to draw down, so that the thickness unevenness of the obtained foamed molded article increases and there is a possibility that a good foamed molded article having excellent thickness accuracy may not be obtained. From the above point of view, the lower limit thereof is preferably 10 g/10 minutes, more preferably 12 g/10 minutes, while the upper limit thereof is preferably 20 g/10 minutes. When the melt flow rate is 10 to 25 g/10 minutes, a foamed molded article having a low apparent density may be produced in a more stable manner.

In the present invention, the difference ($T_mA-T_mB$) between the melting point $T_mA$ of the resin (A) and the melting point $T_mB$ of the resin (B) is −5 to 5° C. When the difference in melting point is within the above range, the occurrence of holes in the foamed molded article and the generation of excessively large cells are suppressed, even when a large amount of the recovered raw material is used. Although the reason for this has not yet been clarified, it is considered that the compatibility between the two resins is improved due to the small difference in melting point therebetween so that both stretch of the resins during extrusion foaming and stretch of the resins during blow molding are improved. Therefore, for example, when the resin (A) is homopolypropylene, it is preferable to use, as the resin (B), one or two or more resins which are selected from homopolypropylenes and impact-resistant polypropylenes and which have a melting point close to the melting point of the resin (A). From this point of view, the lower limit of the difference ($T_mA-T_mB$) is preferably −4° C., while the upper limit is preferably 4° C.

Further, it is necessary that a difference ($T_cA-T_cB$) between the crystallization temperature $T_cA$ of resin (A) and the crystallization temperature $T_cB$ of the resin (B) should be 0 to 10° C. That is, as the resin (B), a linear polypropylene-based resin having a crystallization temperature relatively higher than the melting point thereof is used. When the difference in crystallization temperature is within the above range, the foamed parison has excellent foamability and blow moldability, and further the obtained foamed molded article has a good inside surface state, even when a large amount of the recovered raw material is used. Although the reason for this has not yet been clarified, it is considered that, since the crystallization temperature of the resin (B) does not exceed the crystallization temperature of the resin (A) and is close to the crystallization temperature of the resin (A), the growth of cells at the time of foaming is not hindered and, additionally, the cell walls are quickly fixed after foaming so that early stabilization of the cell structure is achieved before blow molding or at an early stage of blow molding. From this point of view, the upper limit of the difference ($T_cA-T_cB$) is preferably 9° C.

The resin (B) is preferably homopolypropylene, impact-resistant polypropylene or a mixture thereof. Among these, homopolypropylene is more preferred.

In the present invention, the resin (B) is a linear polypropylene-based resin having the above specific MT and MFR and having specific ranges of differences in melting point and in crystallization temperature from the resin (A). Because of the inclusion of such resin (B) together with the resin (A) and the recovered raw material (C) in the base resin, a good polypropylene-based resin article having a low apparent density can be obtained in a stable manner even when the recovered raw material (C) is used in a large amount.

Specific examples of the resin (B) include homopolypropylene (trade names: J105G, J106G) manufactured by Prime Polymer Co., Ltd. and the like.

The recovered raw material (C) in the present invention is a resin recovered in the course of production of a polypropylene foamed molded article. That is, the recovered raw material (C) is a waste generated in the course of various production steps of the foamed molded article of the present invention. Examples of the waste include resin compositions recovered from the kneading step and the extrusion step, burrs generated in the blow molding step, and defective products of the foamed molded articles. These wastes, after being collected, may be subjected to an appropriate treatment selected from pulverization, kneading, repelletization and a combination thereof, as necessary. In actual production, the recovered raw material (C) contains such resin (A) and resin (B) that have been repeatedly kneaded many times with extruders.

Therefore, the recovered raw material (C) includes a resin that contains the resin (A) and the resin (B) kneaded together at least once with an extruder. Further, when the base resin is added with other components such as an olefin-based thermoplastic elastomer, the recovered raw material (C) also contains the olefin-based thermoplastic elastomer, etc.

The recovered raw material (C) has a melt tension (230° C.) of 5 to 50 mN. Usually, the upper limit is 50 mN. However, the upper limit may be less than 30 mN, even less than 25 mN, when the mixing amount of the resin (A) in the base resin at the time of producing the foamed molded article is small, or when the extrusion temperature at the time of producing the recovered raw material is high. On the other hand, when the melt tension is too small, generation of excessively large cells, etc. is unable to be suppressed, so that there is a possibility that a good foamed molded article having a low apparent density is unable to be obtained. From this point of view, the lower limit is preferably 10 mN.

The recovered raw material (C) has a melt flow rate (230° C., load of 2.16 kg) of 2 to 50 g/10 minutes. When the melt flow rate is excessively large, occurrence of drawdown of the foamed parison becomes so significant that the resulting foamed molded article may have uneven thickness. Thus, there is a possibility that and a good foamed molded article may not be obtained. From this point of view, the upper limit is preferably 40 g/10 minutes. When the melt flow rate is excessively small, on the other hand, the molten base resin may generate heat, so that there is a possibility that a good foamed molded article is unable to be obtained. From this point of view, the lower limit is preferably 10 g/10 minutes, more preferably 20 g/10 minutes.

As described above, in the actual production of foamed molded articles, the recovered raw material (C) is repeatedly used. Therefore, the recovered raw material (C) contains polypropylenes which have undergone a large number of thermal histories during kneading with extruders. When the number of thermal histories increases, cutting of the branched chains of the polypropylene-based resin contained in the recovered raw material (C) proceeds, so that the melt tension of the recovered raw material (C) decreases and the melt flow rate increases. When such a recovered raw material is used, foam blow moldability is reduced, and it becomes more difficult to obtain a good foam molded article.

However, according to the present invention, by using the recovered raw material (C) as the base resin in combination with the resin (A) and the resin (B), a good foam molded article having excellent foam blow moldability and a low apparent density can be obtained, even when a recovered raw material having a low melt tension is used as the recovered raw material (C) or even when a recovered raw material having a high melt flow rate is used.

The melt tension may be measured using a measuring device such as Capirograph 1 D manufactured by Toyo Seiki Selsakusho, Ltd. First, an orifice having a nozzle diameter of 2.095 mm and a length of 8.0 mm is set in a cylinder having a cylinder diameter of 9.55 mm and a length of 350 mm. The cylinder and the orifice are set at a temperature of 230° C. A polypropylene-based resin specimen in a required amount is charged into the cylinder and held for 4 minutes to form a molten resin of the resin specimen. The molten resin is then extruded in the form of a string through the orifice at a piston speed of 10 mm/minute. The string is put on a tension-detecting pulley having a diameter of 45 mm and is taken up on a take-up roller while increasing the take-up speed at a constant take-up acceleration rate such that the take-up speed increases from 0 m/minute to 200 m/minute through a period of 4 minutes. As a result of this operation the string is broken. The maximum value of tension immediately before the string breaks is measured. The reason for adopting a time period of 4 minutes until the take-up speed reaches 200 m/minute from 0 m/minute is to suppress thermal deterioration of the resin and to improve the reproducibility of the measured values. The above measurement is carried out for ten different samples. From the obtained ten measured maximum values, the largest three values and the smallest three values are excluded. The arithmetic mean of the rest intermediate four maximum values represents the melt tension (mN) in the method of the present invention.

However, when the resin string does not break up to the take-up speed of 200 m/minute in the above method for the measurement of the melt tension, then the melt tension (mN) is as measured by the take-up operation at a constant take-up speed of 200 m/minute. More concretely, in the same manner as that described above, the molten resin is extruded from the orifice in the form of a string, and the extruded resin string is put on a tension-detecting pulley and taken up on a take-up roller while increasing the take-up speed at a constant take-up acceleration rate such that the take-up speed increases from 0 m/minute to 200 m/minute through a period of 4 minutes. When the take-up speed of 200 m/minute is reached, recording of the melt tension data is started and is stopped after 30 seconds. From the tension load curve obtained during the measuring period of 30 seconds, an arithmetic mean (Tave) of the maximum tension (Tmax) and minimum tension (Tmin) is determined and is used as the melt tension in the method of the present invention. The Tmax as used herein is a value obtained by dividing a sum of the tension values of the peaks detected in the tension load curve by the number of the peaks, while the Tmin as used herein is a value obtained by dividing a sum of the tension values of the dips detected in the tension load curve by the number of the dips. The above measurement should be carried out in such a way that inclusion of air bubbles in the string is prevented as much as possible at the time of extrusion of the molten resin into the string form through the orifice.

The melt flow rate (MFR) of the polypropylene-based resin in the present specification means a melt mass flow rate measured by the test method A of JIS K 7210-1(2014) using the conditions of a test temperature of 230° C. and a load of 2.16 kg.

The melting point in the present specification means a fusion peak temperature determined by heat flux differential scanning calorimetry according to JIS K7121(1987). As adjustment of the conditions of the sample, "measurement of melting temperature after the sample has been subjected to specified heat treatment" is adopted. As a cooling rate in the measurement is 10° C. per minute. As a heating rate in the measurement of the melting temperature is 10° C. per minute. When two or more fusion peaks appear, the peak top temperature of the fusion peak that has the largest area represents the melting point.

In the present specification, the crystallization temperature means a crystallization peak temperature determined by heat flux differential scanning calorimetry based on JIS K7122(1987). A cooling rate of 10° C. per minute is adopted. When two or more crystallization exothermic peaks appear, the peak top temperature of the crystallization peak having the largest area represents the crystallization temperature.

The composition of the base resin used in the present invention will be described next. The mixing amount of the branched polypropylene-based resin (A) is 5% by weight or more and less than 20% by weight based on 100% by weight of the base resin. When the amount is too large, the production cost is not sufficiently reduced, so that there is a possibility that the object of the present invention may not be achieved. From this point of view, the upper limit of the amount in the base resin is preferably 15% by weight, more preferably 13% by weight. When the amount is too small, on the other hand, the foamability of the base resin may decrease, so that there is a possibility that a good foamed molded article may not be obtained. From this point of view, the lower limit of the mixing amount in the base resin is preferably 6% by weight, more preferably 7% by weight.

The mixing amount of the recovered raw material (C) in the base resin is more than 65% by weight and not more than 90% by weight based on 100% by weight of the base resin. When the amount is too large, the foamability of the base resin is reduced, so that there is a possibility that a good foamed molded article having a low apparent density may not be obtained. From this point of view, the upper limit of the mixing amount in the base resin is preferably 87% by weight, more preferably 85% by weight. When the amount is too small, the production cost may not be sufficiently reduced, so that there is a possibility that the object of the present invention may not be achieved. From this point of view, the lower limit of the mixing amount in the base resin is preferably 70% by weight, more preferably 75% by weight.

Further, in the present invention, the weight ratio (A:B) of the amount of the branched polypropylene-based resin (A) to the amount of the linear polypropylene-based resin (B) is 80:20 to 40:60. When the amount of the resin (B) is too small, there is a possibility that the production cost may not be sufficiently reduced. When the amount is too large, the foamability of the base resin may be reduced, so that there is a possibility that a good foamed molded article may not be obtained. From this point of view, the ratio (A:B) is preferably from 75:25 to 45:55.

In the present invention, as long as the object and effect of the present invention are not adversely affected, the base resin may be incorporated with a thermoplastic resin, such as a polyethylene-based resin and a polystyrene-based resin, and a thermoplastic elastomer, such as an olefin-based thermoplastic elastomer and a styrene-based thermoplastic elastomer. In particular, by adding an olefin-based thermoplastic elastomer, the impact resistance of the foamed molded article at a low temperature can be improved.

Examples of the olefin-based thermoplastic elastomer include a mixture comprised of a hard segment constituted of a polypropylene-based resin and a soft segment constituted of an ethylene-based rubber such as ethylene-propylene rubber (which may contain a diene component, etc.); a block copolymer having a hard segment comprised of a polyethylene block and a soft segment comprised of an ethylene/α-olefin copolymer block; and an ethylene/α-olefin copolymer.

As commercially available olefinic thermoplastic elastomers (TPO), there may be mentioned, for example, trade name "THERMORUN" (manufactured by Mitsubishi Chemical Corporation), trade name "MILASTOMER" (manufactured by Mitsui Chemicals Inc.), trade name "SUMITOMO TPE" (Sumitomo Chemical Co., Ltd.), trade name "INFUSE" (Dow Chemical Company), and trade name "CATALLOY ADFLEX Q100F" (Sun Allomer Co. Ltd.).

The total mixing amount of the thermoplastic elastomer in the base resin may be such an appropriate amount that is necessary for exhibiting the above-mentioned effects, as long as the objects and effects of the present invention are not adversely affected. The total amount is preferably 5 to 25% by weight, more preferably 10 to 20% by weight, and still more preferably 12 to 18% by weight, based on 100% by weight of the base resin. When the recovered raw material (C) contains a thermoplastic elastomer, the amount of the thermoplastic elastomer newly added to the base resin is suitably adjusted such that the amount of the thermoplastic elastomer contained in the recovered raw material (C) and the amount of the thermoplastic elastomer newly added to the base resin are in the above range in total. For instance, when the recovered raw material (C) containing 15% by weight of the thermoplastic elastomer is added to the base resin in an amount of 80% by weight, the thermoplastic elastomer shall be newly added to the base resin in an amount of 3% by weight in order to adjust the mixing amount of the thermoplastic elastomer in the base resin to 15% by weight.

In the present invention, the foamable molten resin obtained by kneading the base resin with the physical blowing agent is extruded from a die and allowed to foam to obtain the foamed parison. As the physical blowing agent, there may be mentioned an organic physical blowing agent such as an aliphatic hydrocarbon, e.g. propane, normal butane, isobutane, normal pentane, isopentane, normal hexane, isohexane, and cyclohexane, a chlorinated hydrocarbon, e.g. methyl chloride and ethyl chloride, a fluorinated hydrocarbons, e.g. 1,1,1,2-tetrafluoroethane and 1,1-difluoroethane, an aliphatic ether, e.g. dimethyl ether, diethyl ether and methyl ethyl ether, an aliphatic alcohol, e.g. methanol and ethanol, and a dialkyl carbonate, e.g. dimethyl carbonate and diethyl carbonate; an inorganic physical blowing agent such as carbon dioxide, nitrogen, air, and water; and a decomposition type chemical blowing agent such as sodium hydrogen carbonate, sodium citrate, and azodicarbonamide. These blowing agents can be used as a mixture.

When the foamed parison 1 is formed using an inorganic physical blowing agent, the resin is not plasticized because foaming is completed quickly due to rapid vaporization of the blowing agent and because the blowing agent hardly or not at all remains present in the resin. Therefore, the obtained foamed parison has better blow moldability as compared with that obtained by using an organic physical blowing agent.

From the above standpoint, it is preferable to use an inorganic physical blowing agent among the above-described blowing agents, it is more preferable to use an inorganic physical blowing agent containing carbon dioxide, and it is further preferable to use a physical blowing agent consisting only of carbon dioxide.

In the method of the present invention, when a blowing agent containing carbon dioxide is used as the physical blowing agent, the content of carbon dioxide is preferably 20 to 100 mol %, more preferably 50 to 100 mol %, still more preferably 70 to 100 mol %, based on 100 mol % of the physical blowing agent. When the content of carbon dioxide is within the above range, a foamed molded article having a small cell diameter and a high closed cell content can be obtained.

The mixing amount of the physical blowing agent is preferably 0.05 to 0.8 mol, more preferably 0.1 to 0.5 mol, based on 1 kg of the base resin.

Various additives such as a cell controlling agent, an ultraviolet absorber, an infrared absorber, an infrared reflector, a flame retardant, a fluidity improver, a weathering agent, a colorant, a heat stabilizer, an antioxidant and a filler may be added into the base resin constituting the foamed parison as necessary.

Next, the physical properties of the foamed molded article obtained by the method of the present invention will be described in the order of average thickness, apparent density and closed cell content.

Average thickness: The average thickness of the foamed molded article of the present invention varies depending on the shape of the intended foamed molded article but is generally preferably 1 to 10 mm, more preferably 1.2 to 7 mm, still more preferably 1.5 to 5 mm. When the average thickness is within the above range, the foamed molded article has an excellent balance between lightness in weight and mechanical strength thereof.

The average thickness in the present invention is measured as follows. Measurement is carried out on cross-sections, that are normal to the longitudinal direction, of a foamed blow-molded article at five positions including a position near the midpoint in the longitudinal direction thereof, positions near both longitudinal ends thereof and positions near the centers between the midpoint and the both ends. Each of the cross-sections is measured for the thickness in the thickness direction at six locations which are equally spaced from each other in the perimeter direction thereof. The maximum value and the minimum value are excluded from the values of the thickness at 30 points obtained in this manner. The average thickness is the arithmetic mean of the rest 28 measured thickness values.

Apparent Density:

The apparent density of the foamed molded article according to the present invention is not specifically limited, but is preferably 0.10 to 0.35 g/cm$^3$. When the apparent density is within the above range, the foamed molded article has excellent lightweight properties and heat insulating properties that are inherent to a foam body and, yet, is able to maintain mechanical strength such as compressive stress. In particular, even when a foamed molded article having a low apparent density of 0.1 to 0.35 g/cm$^3$ is intended to be produced, it is possible to produce such a foamed molded article in a stable manner.

In the present invention, the measurement of the apparent density is carried out as follows. The apparent density is determined by dividing the weight (g) of the foamed molded article by the volume (cm$^3$) of the foamed molded article. The volume of the foamed molded article can be determined by a method in which the foamed molded article is immersed in water contained in a vessel with graduation to measure a rise in water level (water immersion method).

Closed Cell Content:

The closed cell content of the foamed molded product is preferably 60% or more, more preferably 65% or more, and even more preferably 70% or more, from the standpoint of heat insulation and mechanical properties.

In the present invention, the measurement of the closed cell content is carried as follows. A test specimen is cut out from the obtained foamed molded article, and Vx is determined by Procedure C of ASTM D2856-70 (reapproved in 1976). The closed cell content is calculated by the formula shown below. Those portions in which the cells are crushed shall be excluded from the measuring object.

Closed cell content (%)=(Vx−Va(ρf/ρs))×100/(Va−Va(ρf/ρs))

Vx: actual volume of test specimen (sum of a volume of the closed cells and a volume of the base resin thereof) (cm$^3$)

Va: apparent volume (cm$^3$) of the test specimen determined from the outer dimensions of the test specimen ρf: apparent density of the test specimen (g/cm$^3$)

ρs: density of the base resin of the test specimen (g/cm$^3$)

The foamed molded article obtained by the present invention is preferably used as, for example, ducts, tanks, containers and pallets.

EXAMPLES

The present invention will be described in more detail below by way of examples. The present invention is not restricted to the examples, however.

The resins used in the production of the foamed molded articles in the examples and comparative examples are shown below. The physical properties of each of the resins are shown in Table 1.

(a) Branched Polypropylene-Based Resin

Abbreviation "WB140": "Homopolypropylene (trade name: WB140)" manufactured by Borealis AG (b) Linear Polypropylene-Based Resins (1) Abbreviation "J106G": Homopolypropylene "J106G" manufactured by Prime Polymer Co., Ltd.

(2) Abbreviation "J105G": Homopolypropylene "J105G" manufactured by Prime Polymer Co., Ltd.

(3) Abbreviation "J700GP": Homopolypropylene "J700GP" manufactured by Prime Polymer Co., Ltd.

(4) Abbreviation "J-721 GR": Propylene-ethylene random copolymer "J-721GR" manufactured by Prime Polymer Co., Ltd.

(5) Abbreviation "J226T": Propylene-ethylene random copolymer "J226T" manufactured by Prime Polymer Co., Ltd.

TABLE 1

|  |  | Melt Tension (230° C.) mN | MFR (230° C., 2.16 kg) g/10 min | Melting Point Tm ° C. | Crystallization Temperature Tc ° C. | TmA-TmB ° C. | TcA-TcB ° C. |
|---|---|---|---|---|---|---|---|
| Resin (A) | WB140 | 390 | 1.7 | 159 | 129 | — | — |
| Resin (B) | J106G (used in Examples 1-4) | 3 | 15 | 162 | 121 | −3 | 8 |
|  | J105G (used in Example 5) | 4 | 9 | 162 | 119 | −3 | 10 |
|  | J700GP (used in Comparative Example 1) | 3 | 9 | 164 | 116 | −5 | 13 |

TABLE 1-continued

|  | Melt Tension (230° C.) mN | MFR (230° C., 2.16 kg) g/10 min | Melting Point Tm ° C. | Crystallization Temperature Tc ° C. | TmA-TmB ° C. | TcA-TcB ° C. |
|---|---|---|---|---|---|---|
| J-721GR (used in Comparative Example 2) | 6 | 11 | 153 | 124 | 6 | 5 |
| J226T (used in Comparative Examples 3 and 4) | 4 | 20 | 133 | 118 | 26 | 11 |

(c) Thermoplastic Elastomer (1) Abbreviation "Q100F": Olefin-based thermoplastic elastomer (TPO) "Cataroy Adflex Q100F" manufactured by Sun Allomer Co., Ltd.; melt flow rate 0.6 g/10 min (230° C., load of 2.16 kg); melt tension 40 mN (230° C.)

(d) Recovered Raw Materials (C)

A branched polypropylene-based resin and a linear polypropylene-based resin shown in Table 2 were mixed at a mixing ratio (weight ratio) shown in Table 2 to obtain a virgin polypropylene raw material. To 85 parts by weight of the virgin polypropylene raw material, 15 parts by weight of Q100F(TPO) were mixed, and a foamed molded article 1 was produced using the mixed raw material under the same conditions as those in Examples and Comparative Examples described hereinafter.

The foamed molded article 1 was then pulverized, and the pulverized product was supplied to an extruder and kneaded at 230° C. to obtain a molten resin. The molten resin was extruded and repelletized to obtain a recovered raw material (1).

Next, a foamed molded article 2 was produced using a mixed raw material obtained by mixing 80% by weight of the recovered raw material (1), 17% by weight of the virgin polypropylene raw material and 3% by weight of Q100F (TPO).

Then, 80% by weight of a recovered raw material (2) obtained by repelletizing the foamed molded article 2 under the same conditions as described above, 17% by weight of the virgin polypropylene raw material, and 3% by weight of Q100F (TPO) were mixed. A foamed molded body 3 was produced using the mixed raw material.

Next, 80% by weight of a recovered raw material (3) obtained by repelletizing the foamed molded article 3 under the same conditions as described above, 17% by weight of the virgin polypropylene raw material, and 3% by weight of Q100F (TPO) were mixed. A foamed molded body 4 was produced using the mixed raw material.

A recovered raw material (4) obtained by repelletizing the foamed molded article 4 under the same conditions as above was used as the recovered raw material (C). Table 2 shows the melt tension and melt flow rate of each of the recovered raw materials (C).

TABLE 2

| | | Composition of Recovered Raw Material | | | | | | | Physical properties of Recovered Raw Material | |
|---|---|---|---|---|---|---|---|---|---|---|
| | | Resin (A) | Resin (B) | | | | | TPO | | |
| | | WB140 | J106G | J105G | J700GP | J-721GR | J226T | Q100F | Melt Tension (230° C.) | MFR (230° C., 2.16 kg) |
| | | Mixing Amount (total of Resin (A), Resin (B) and TPO is 100% by weight) | | | | | | | Mixing Weight Ratio (A:B) | |
| | | wt % | wt % | wt % | wt % | wt % | wt % | wt % | mN | g/10 min |
| Recovered Raw Material (C) | Recovered Raw Material C1 *1 | 59.5 | 25.5 | — | — | — | — | 15 | 70:30 | 17 | 31 |
| | Recovered Raw Material C2 *2 | 51 | 34 | — | — | — | — | 15 | 60:40 | 14 | 35 |
| | Recovered Raw Material C3 *3 | 42.5 | 42.5 | — | — | — | — | 15 | 50:50 | 11 | 38 |
| | Recovered Raw Material C4 *4 | 59.5 | — | 25.5 | — | — | — | 15 | 70:30 | 20 | 24 |
| | Recovered Raw Material C5 *5 | 42.5 | — | — | 42.5 | — | — | 15 | 50:50 | 17 | 28 |
| | Recovered Raw Material C6 *6 | 42.5 | — | — | — | 42.5 | — | 15 | 50:50 | 24 | 31 |
| | Recovered Raw Material C7 *7 | 59.5 | — | — | — | — | 25.5 | 15 | 70:30 | 19 | 33 |
| | Recovered Raw Material C8 *8 | 42.5 | — | — | — | — | 42.5 | 15 | 50:50 | 12 | 40 |

*1: Used in Examples1 and 2
*2: Used in Example 3
*3: Used in Example 4
*4: Used in Example 5
*5: Used in Comparative Example 1
*6: Used in Comparative Example 2
*7: Used in Comparative Example 3
*8: Used in Comparative Example 4

Examples 1 to 5 and Comparative Examples 1 to 4

A base resin obtained by mixing the resin (A), the resin (B), the recovered raw material (C) and Q100F (TPO) shown in Table 3-1 in the amounts shown in Table 2 and 0.6 part by weight of talc (cell controlling agent) based on 100 parts by weight of the base resin were fed to an extruder having an inner diameter of 65 mm and kneaded at 230° C., into which carbon dioxide ($CO_2$) in the amount shown in Table 3-2 as a physical blowing agent was injected from a middle of the extruder. The mixture was further kneaded to obtain a foamable molten resin.

The foamable molten resin was then adjusted to the temperature shown in Table 3-2 and charged in an accumulator provided on a downstream side of the extruder. The foamable resin melt was then extruded through an annular lip, which had a diameter of 75 mm and was attached to a tip of the accumulator, into the atmosphere in the form of a tube at the mean clearance (mm) and discharge rate (kg/hr) shown in Table 3-2 and allowed to foam, thereby obtaining a foamed parison.

Next, after pinching a lower part of the foamed parison, pre-blow air was supplied to the hollow portion of the foamed parison to inflate the foamed parison. The inflating foamed parison was sandwiched by a two-part mold provided right beneath the die. After completion of the mold clamping, blow air at a pressure of 0.1 MPa (G) was blown into the hollow portion inside the foamed parison, and at the same time, air was sucked from a hole provided in the mold, whereby the foamed parison was formed into a shape conforming to the mold. After cooling, the mold was opened to take out the foamed molded article with molding burrs. The burrs were removed from the foamed molded article to obtain a hollow foamed molded article having a longitudinal length of 740 mm and a maximum peripheral length of 370 mm. Table 4 shows physical properties and evaluation results of the foamed molded articles obtained in Examples and Comparative Examples.

TABLE 3-1

| | Composition Base Resin | | | | | | | |
|---|---|---|---|---|---|---|---|---|
| | Resin (A) | Resin (B) | | | | | Recovered Raw Material (C) | | TPO |
| | WB140 wt % | J106G wt % | J105G wt % | J700GP wt % | J-721GR wt % | J226T wt % | Mixing Amount wt % | Kind — | Q100F wt % |
| Example 1 | 11.9 | 5.1 | — | — | — | — | 80 | C1 | 3 |
| Example 2 | 11.9 | 5.1 | — | — | — | — | 80 | C1 | 3 |
| Example 3 | 10.2 | 6.8 | — | — | — | — | 80 | C2 | 3 |
| Example 4 | 8.5 | 8.5 | — | — | — | — | 80 | C3 | 3 |
| Example 5 | 11.9 | — | 5.1 | — | — | — | 80 | C4 | 3 |
| Comparative Example 1 | 8.5 | — | — | 8.5 | — | — | 80 | C5 | 3 |
| Comparative Example 2 | 8.5 | — | — | — | 8.5 | — | 80 | C6 | 3 |
| Comparative Example 3 | 11.9 | — | — | — | — | 5.1 | 80 | C7 | 3 |
| Comparative Example 4 | 8.5 | — | — | — | — | 8.5 | 80 | C8 | 3 |

TABLE 3-2

| | Composition | | Production Conditions | | |
|---|---|---|---|---|---|
| | Base Resin | Blowing | | | |
| | Mixing Weight Ratio A:B | Agent CO2 mol/kg | Resin Temperature °C. | Discharge Rate kg/h | Clearance mm |
| Example 1 | 70:30 | 0.18 | 169 | 550 | 0.5 |
| Example 2 | 70:30 | 0.27 | 167 | 600 | 0.5 |
| Example 3 | 60:40 | 0.18 | 168 | 550 | 0.5 |
| Example 4 | 50:50 | 0.14 | 169 | 600 | 0.5 |
| Example 5 | 70:30 | 0.18 | 168 | 550 | 0.5 |
| Comparative Example 1 | 50:50 | 0.14 | 169 | 550 | 0.5 |
| Comparative Example 2 | 50:50 | 0.18 | 168 | 500 | 0.5 |
| Comparative Example 3 | 70:30 | 0.18 | 168 | 550 | 0.5 |
| Comparative Example 4 | 50:50 | 0.18 | 168 | 550 | 0.5 |

TABLE 4

| | Physical Properties of Foamed Molded Article | | | Evaluation | | |
|---|---|---|---|---|---|---|
| | Average Thickness mm | Apparent Density g/cm³ | Closed Cell Content % | Excessively Large Cells | State of Inside Surface | Moldability (stretchability) |
| Example 1 | 2.0 | 0.23 | 73 | none | ○ | ○ |
| Example 2 | 3.1 | 0.15 | 68 | none | ○ | ○ |
| Example 3 | 2.0 | 0.23 | 75 | none | ○ | ○ |
| Example 4 | 1.8 | 0.26 | 71 | none | ○ | ○ |
| Example 5 | 1.8 | 0.25 | 76 | none | ○ | ○ |
| Comparative Example 1 | 1.8 | 0.45 | 46 | none | × | × |
| Comparative Example 2 | 1.7 | 0.60 | 23 | generated | ○ | × |
| Comparative Example 3 | 2.9 | 0.20 | 88 | generated | ○ | ○ |
| Comparative Example 4 | 1.9 | 0.53 | 67 | generated | ○ | ○ |

In Table 4, the measurement and evaluation of various physical properties of the foamed molded articles were performed as follows.

Apparent Density:

The apparent density of the foamed molded article was obtained by dividing the weight [g] of the foamed molded article by the volume [cm³] of the foamed molded article determined by the water submerged method.

Average Thickness:

The average thickness of the foamed molded article was measured by the method described previously.

Closed Cell Content:

Test pieces were cut out from the foamed molded article at positions near both ends in the longitudinal direction and at a position near the center in the longitudinal direction thereof. Each test piece was measured for its Vx according to (Procedure C) of ASTM D2856-70 (re-approved 1976), and the closed cell content of each test piece was calculated by the afore-mentioned formula. The arithmetic mean value of the closed cell contents calculated for each test piece represents the closed cell content of the foamed molded article.

Generation of Excessively Large Cells:

An outer surface of the foamed molded article was visually observed to evaluate the generation of excessively large cells according to the following criteria. The term "excessively large cell" is intended to refer to a cell that is significantly larger than other cells surrounding that cell. The presence of excessive bubbles causes deterioration of the appearance of the foamed molded article and reduction of the mechanical strengths thereof.

None: There are no excessively large cells in the outer surface of the foam molded article.

Generated: Excessively large cells are generated on the outer surface of the foamed molded article.

State of Inside Surface:

An inside surface of the obtained foam molded article was visually observed to evaluate the state of the inside surface according to the following criteria. When broken cells are present on the inside surface of the foamed molded article, air that is passed through the hollow portion of the foamed molded article will generate significant wind noises.

○: No breakage of cells or the like is present on the inside surface of the foamed molded article.

x: Breakage of cells or the like is observed on the inside surface of the foam molded article.

Moldability (Stretchability):

The obtained molded foamed article was visually observed to evaluate the moldability (stretchability) according to the following criteria. When through-holes extending in the thickness direction are present in the foamed molded article, the mechanical strength of the foamed molded article decreases. Further, the foam molded article cannot be used as a duct.

○: The elongation of the foamed resin is good so that the foamed molded article has no through-holes extending in the thickness direction.

x: The elongation of the foamed resin is not good so that through-holes are formed in the foamed molded article.

EXPLANATION OF REFERENCE NUMERALS

1: Foamed parison
2: Die
3: Split-type mold

The invention claimed is:

1. A method for producing a polypropylene-based resin foamed molded article, comprising
    extruding a foamable molten resin, obtained by kneading a base resin and a physical blowing agent, through a die to form a foamed parison, and
    blow molding the foamed parison,
    wherein said base resin comprises a branched polypropylene-based resin (A), a linear polypropylene-based resin (B) and a recovered raw material (C) that is recovered in the course of production of the polypropylene-based resin foamed molded article,
    wherein the branched polypropylene-based resin (A) has a melt tension (230° C.) of greater than 100 mN and a melt flow rate (230° C., load of 2.16 kg) of 0.1 to 15 g/10 min,
    the linear polypropylene-based resin (B) has a melt tension (230° C.) of less than 30 mN (not inclusive of 0) and a melt flow rate (230° C., load of 2.16 kg) of 5 to 25 g/10 min,
    the recovered raw material (C) has a melt tension (230° C.) of 5 to 50 mN and a melt flow rate (230° C., load of 2.16 kg) of 2 to 50 g/10 min, and
    wherein a difference ($T_mA-T_mB$) between a melting point $T_mA$ of the branched polypropylene-based resin (A) and a melting point $T_mB$ of the linear polypropylene-based resin (B) is −5° C. to 5° C.,
    a difference ($T_cA-T_cB$) between a crystallization temperature $T_cA$ of the branched polypropylene-based resin (A) and a crystallization temperature $T_cB$ of the linear polypropylene-based resin (B) is 0 to 10° C.,
    a mixing amount of the branched polypropylene-based resin (A) in the base resin is 5% by weight or more and less than 20% by weight based on 100% by weight of the base resin and a mixing amount of the recovered raw material (C) in the base resin is more than 65% by weight and 90% by weight or less based on 100% by weight of the base resin, and
    a weight ratio (A:B) of the mixing amount of the branched polypropylene-based resin (A) to a mixing amount of the linear polypropylene-based resin (B) in the base resin is 80:20 to 40:60.

2. The method for producing a polypropylene-based resin foamed molded article according to claim 1, wherein the melt flow rate (230° C., load of 2.16 kg) of the linear polypropylene-based resin (B) is 10 to 25 g/10 min.

3. The method for producing a polypropylene-based resin foamed molded article according to claim 1, wherein the melt tension (230° C.) of the recovered raw material (C) is 5 mN or more and less than 30 mN.

4. The method for producing a polypropylene-based resin foamed molded article according to claim 1, wherein the physical blowing agent is an inorganic physical blowing agent.

5. The method for producing a polypropylene-based resin foamed molded article according to claim 1, wherein the foamed molded article has an apparent density of 0.10 to 0.35 g/cm$^3$.

* * * * *